US006280625B1

United States Patent
Jackson, Jr. et al.

(10) Patent No.: US 6,280,625 B1
(45) Date of Patent: Aug. 28, 2001

(54) IN-SITU REMEDIATION SYSTEM FOR VOLATILE ORGANIC COMPOUNDS WITH DEEP RECHARGE MECHANISM

(75) Inventors: Dennis G. Jackson, Jr., Augusta, GA (US); Brian B. Looney, Aiken, SC (US); Ralph L. Nichols; Mark A. Phifer, both of Augusta, SC (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

(21) Appl. No.: 09/425,530

(22) Filed: Oct. 22, 1999

Related U.S. Application Data

(63) Continuation-in-part of application No. 09/051,076, filed as application No. PCT/US97/23935 on Dec. 19, 1997, now abandoned.

(51) Int. Cl.⁷ .................. C02F 3/00; C02F 7/00; C02F 9/00
(52) U.S. Cl. .............. 210/617; 210/620; 210/747; 210/758; 210/150; 210/170; 210/673; 210/221.2; 210/660; 210/749
(58) Field of Search ..................... 210/615, 616, 210/617, 620, 747, 758, 150, 170, 221.2, 673, 661, 660, 749

(56) References Cited

U.S. PATENT DOCUMENTS

| | | |
|---|---|---|
| 5,104,554 | 4/1992 | Dempsey . |
| 5,180,503 | 1/1993 | Gorelick et al. . |
| 5,358,357 * | 10/1994 | Mancini . |
| 5,425,589 | 6/1995 | Pennington . |
| 5,577,558 | 11/1996 | Abdul et al. . |
| 5,622,450 | 4/1997 | Grant, Jr. . |
| 6,012,517 * | 1/2000 | Schuring . |
| 6,174,108 * | 1/2001 | Suthersan . |

OTHER PUBLICATIONS

"United States Patent No. 4,401,569, Method and apparatus for treating hydrocarbon and halogenated hydrocarbon contaminated ground and ground water," Corporate Intelligence, Inc., dated Dec. 3, 1998 (no drawings).*

"United States Patent No. 5,534,154, System for cleaning contaminated soil," Corporate Intelligence, Inc., dated Dec. 3, 1998 (author unknown) (no drawings).*

"United States Patent No. 5,302,286, Method and apparatus for in situ groundwater remediation," Corporate Intelligence, Inc., dated Dec. 3, 1998 (author unknown) (no drawings).*

"United States Patent No. 4,832,122, In–Situ remediation system and method for contaminated groundwater," Corporate Intelligence, Inc., dated Dec. 3, 1998 (author unknown) (no drawings).*

\* cited by examiner

*Primary Examiner*—Chester T. Barry
(74) *Attorney, Agent, or Firm*—J. Herbert O'Tool; Hardaway/Mann IP Group; Nexsen Pruet Jacobs & Pollard, LLC

(57) ABSTRACT

A method and apparatus for the treatment and remediation of a contaminated aquifer in the presence of an uncontaminated aquifer at a different hydraulic potential. The apparatus consists of a wellbore inserted through a first aquifer and into a second aquifer, an inner cylinder within the wellbore is supported and sealed to the wellbore to prevent communication between the two aquifers. Air injection is used to sparge the liquid having the higher static water level and, to airlift it to a height whereby it spills into the inner cylinder. The second treatment area provides treatment in the form of aeration or treatment with a material. Vapor stripped in sparging is vented to the atmosphere. Treated water is returned to the aquifer having the lower hydraulic potential.

39 Claims, 3 Drawing Sheets

IN-SITU REMEDIATION SYSTEM FOR VOLATILE ORGANIC COMPOUNDS WITH DEEP RECHARGE MECHANISM

RELATED APPLICATIONS

This application is a continuation-in-part of U.S. patent application Ser. No. 09/051,076 filed Apr. 1, 1998, now abandoned, which was the National Stage of International Application PCT/US97/23935, filed Dec. 19, 1997.

This invention was made with government support under contract DE-AC09-96SR18500 awarded by the U.S. Department of Energy to Westinghouse Savannah River Company and the Government has certain rights in this invention.

FIELD OF THE INVENTION

This invention relates to an apparatus and a method for the treatment and remediation of contaminated aquifers.

BACKGROUND OF THE INVENTION

Contaminated water supplies have long been recognized as a problem and the interest has been heightened by population movements and public awareness of the effects of pollution which attend an industrialized society.

The sources of contaminants which may enter aquifers are many and may be man-made or naturally occurring. Based upon analysis of volume and relative toxicity, four categories of pollutants are most frequently addressed. Organic solvents including chlorinated cleaning fluids such as TCE, liquid fuels such as gasoline and heating oil, toxic metals of industrial and geological origin and agricultural chemicals, especially herbicides.

Chemical solvents and refined petroleum products typically have a significant vapor pressure and are characterized by the environmental protection agency as volatile organic compounds (VOC). Most are sparingly soluble in water and can be stripped at atmospheric pressure or below by sparging. They behave according to Henry's Law. Sparging is a well-known technique and has been practiced in various forms for decades, if not centuries. Numerous patents have taken advantage of Henry's Law to purify water, including contaminated aquifers.

U.S. Pat. No. 4,832,122 to Corey et al. discloses a two well system operated in a push-pull fashion to force volatiles from contaminated groundwater.

U.S. Pat. No. 5,104,554 to Dempsey discloses the use of a sparger to modify a conventional drinking well for the purpose of removing radon gas.

U.S. Pat. No. 5,180,503 to Gorelick et al. teaches stripping VOC's from a saturated zone using compressed air. The water entrained by the rising air is returned to the vadose zone via a plurality of buried pipes.

Pennington, U.S. Pat. No. 5,425,598, describes a sparging apparatus which uses air lift to sparge contaminated groundwater and create a circulation of water from a lower level of an aquifer to a higher level of the same aquifer.

U.S. Pat. No. 5,577,558 to Abdul et al. is directed to sparging and air lifting contaminated groundwater as part of a treatment system which includes injection of compressed gases.

U.S. Pat. No. 5,622,450 to Grant, Jr., uses sparging and gas lift as part of a method for treatment using gas injected into the vadose zone to support aerobic decomposition of contaminants and to vent the vadose zone.

Organic liquids which have a low vapor pressure are not readily sparged and the energy required to separate them from water by steam distillation is prohibitively expensive when large volumes of liquid are under consideration. Adsorption onto a solid substraight strate is one alternative for their removal.

Toxic metals occur in several forms. Zero-valance metals are usually insoluble in water but may be carried in suspension as particles. Metal salts, which may have been introduced in kind into the aquifer or which may have been formed in an aquifer having a low pH are not removed by sparging but are amenable to treatment using ion exchange resins. Organometallic compounds constitute a less common problem and must be addressed on a case-by-case basis.

Persistent, low volatility, solid organic compounds migrate slowly but their toxicities tend to be cumulative. This is particularly true of chlorinated and brominated compounds used as herbicides, moldicides and nematocides. Treatment is species specific and advantage is often taken of the polarity of the compound in selecting a suitable treatment agent.

The purification of water in small volumes is not a daunting task chemically, but the economical treatment of large volumes of water at times is challenging.

Pumping water out of an aquifer and treating it above ground has been disclosed in many patents.

Examples include U.S. Pat. No. 5,358,357 to Mancini et al. and the aforementioned patent to Grant, Jr.

When a contaminated aquifer is pumped to the surface for treatment, facilities must be provided for the treatment and the cost of construction may be significant. The above-ground facilities are not easily disguised and require regular maintenance. The treated water must be returned to the source by either a second well or by spraying over a large drainage field, especially in residential neighborhoods where leaking buried fuel oil tanks threaten nearby wells. Unsightly above-ground treatment facilities may lead to social unrest. Discharge permits may be required under national or local laws.

In situ remediation to remove low volatility compounds has been attempted. U.S. Pat. No. 5,398,756 to Brodsky et al. and U.S. Pat. No. 5,476,992 to Ho et al. are typical of methods which treat by addition of a foreign material into the contaminated region. U.S. Pat. No. 5,534,154 to Gillham describes methods for the treatment of groundwater in situ using a trench or externally. The specific method of treatment is a combination of activated carbon and "metals" typically including iron.

Abdul et al. cited above uses microbes is a treatment region contained within a wellbore and located below ground level.

Geological formations occur in an almost-infinite variety and consist of various layers of loam, clay, shell and rock. A multiplicity of aquifers may exist at different depths and their plan areas may or may not largely overlap. When pumping an aquifer for any reason, it is desirable to return as much water as possible to maintain hydraulic pressure.

BRIEF SUMMARY OF THE INVENTION

One object of this invention is to provide an apparatus for the treatment of a contaminated aquifer in the presence of an uncontaminated or less contaminated aquifer.

Another objective of this invention is to provide an apparatus which treats a contaminated aquifer containing multiple contaminants by different methods while using a single device.

It is another objective of this invention to avoid the depletion of scarce underground water sources in arid regions, i.e., to reclaim treated water by deep recharge.

It is another objective of this invention to provide an apparatus which is located primarily underground and does not require large buildings and other appurtenances above ground level.

These and other objectives are met by an apparatus consisting of a wellbore which is inserted through an upper aquifer and into a second lower aquifer. Within the wellbore is an inner cylinder which is open at top and bottom, the bottom opening being below the level of the upper aquifer and into the lower aquifer. The inner cylinder and the wellbore are sealed from each other by a seal at a level between the aquifers. Because the inner cylinder is responsive to the hydraulic pressure from the lower aquifer and the annular area between the inner cylinder and the wellbore above the seal is responsive to the height and pressure of the upper aquifer, the static levels of the water inside and outside of the inner cylinder are different. In a first embodiment an air line feeding a distributor conveys air to an area between the inner cylinder and the wellbore which causes air lift to occur in the annular space. The air lift is sufficient to raise the level of the water in the annular area until it reaches the level of the top of the inner cylinder, at which point the water cascades into the inner cylinder and is ultimately commingled with the water from the lower aquifer. The turbulence created by the air, in addition to the mere presence of the air, sparges the water in the annular space and the vapor from the head space can be withdrawn and discharged or treated as required.

Water pouring into the inner cylinder may be treated additionally using low flow air injection, or by a treatment modality in which the water which cascades over is run through a structured or unstructured packing material selected to remove or convert one or more materials in the contaminated aquifer, which may not be amenable to vapor stripping.

When the aquifer to be treated, i.e., the contaminated aquifer, is at the lower level, the flow between pipes may be reversed by locating the discharge point for the air-lift air supply within the inner cylinder and locating the treatment system in the annular space between cylinders.

DETAILED DESCRIPTION OF THE INVENTION

The invention requires the use of two concentric pipes. The outer pipe is inserted into the drilled well. The inner cylinder is carried within the outer cylinder or wellbore and projects from the level of the upper aquifer (preferably into the lower aquifer) to a level above the static height of the upper aquifer. An air line supplies air to a distributor means located in the annular region between the inner cylinder and the wellbore to provide a bubbling and agitating effect in the annular area.

Figure 1:
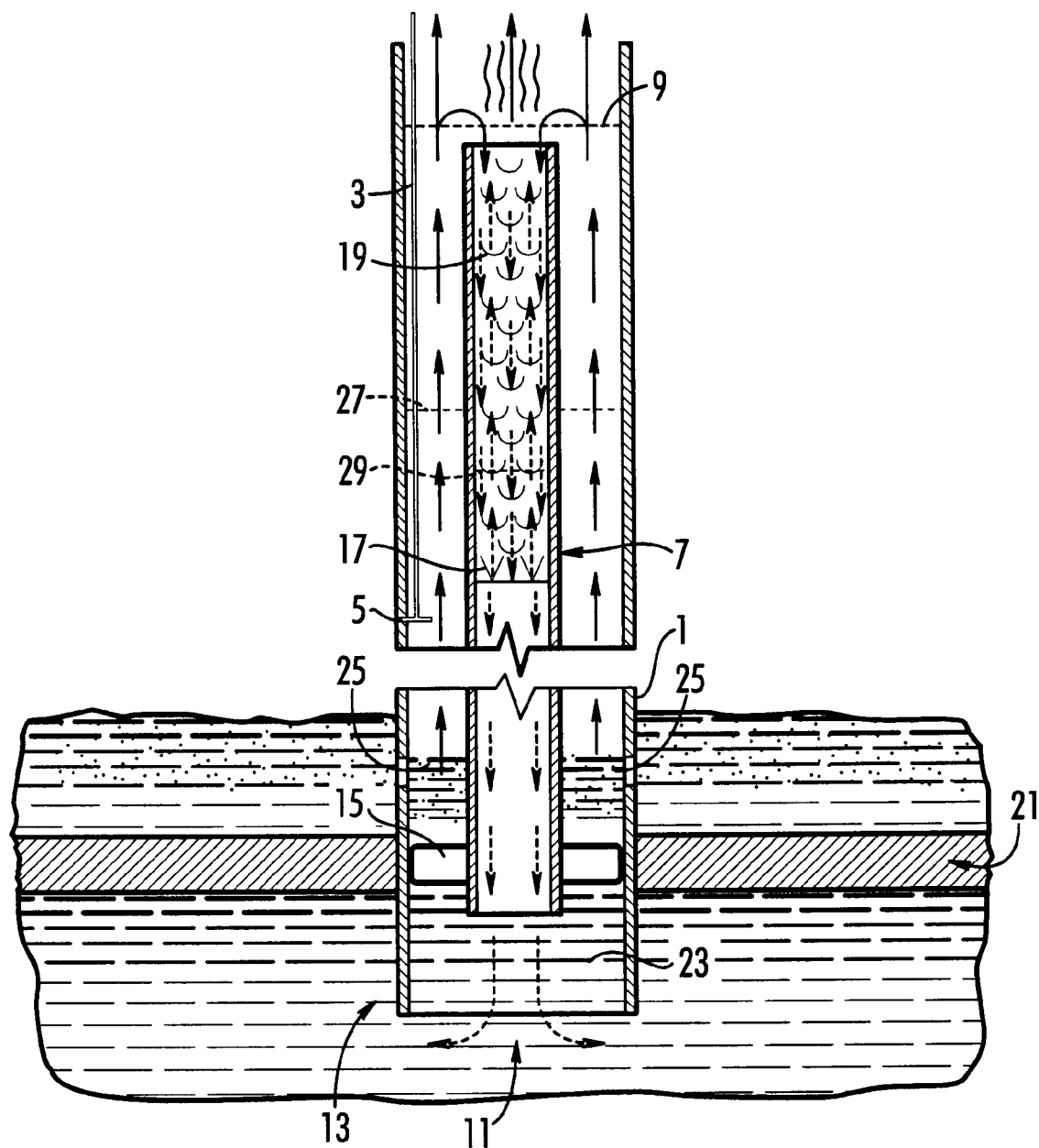
FIG. 1 illustrates a first embodiment of the invention which is directed to vapor stripping only.

FIG. 1 is a drawing of a first embodiment of the invention. This embodiment is directed to vapor stripping, or sparging, of the water from a contaminated upper aquifer to an uncontaminated lower aquifer. Wellbore 1 extends from the level of a lower aquifer upwardly through a confining zone and further upward through the contaminated aquifer. The top of the wellbore pipe may be at or below grade level and provided with a suitable cap. Inner cylinder 7 may be affixed to wellbore 1 but is preferably suspended by a rod or cable (not shown) for removal and or vertical relocation. Wellbore 1 has a well screen for the admission of water from the contaminated aquifer and may also have a well screen through a lower region to discharge water into the lower aquifer.

The well screen is conventionally fabricated in the form of a multiplicity circumferential slot around the wellbore casing so as to form a type of screen. The operation of the screen, and the well, is facilitated by providing a "gravel pack" of coarse sand around the well bore in the vicinity of the well screen.

An air injection line 3 passes downwardly from the top of the wellbore to a position below the static water level 27 in the upper aquifer. This line may be attached to an annular distribution ring. The location of the distribution ring 5 or similar may be raised or lowered by conventional means such as one or more cables. Alternatively, it may be affixed to the wellbore or the inner cylinder. The flow of air in the form of vigorously rising bubbles provides an air lift of the water in the annular area, causing its top surface 9 to be lifted above the top of the open inner cylinder 7. The water then cascades downwardly in inner cylinder 7 to create a head within the cylinder above the static water level 29 of the lower aquifer and below the top of inner cylinder 7.

This head or "mound" determines the operating water level of the aquifer, which is higher than the static level. In operation, the mound must be kept well below the top of inner cylinder 7 to allow treatment of the overflowed water within the inner cylinder.

In the embodiment of FIG. 1 the water discharged into the inner cylinder is caused to tumble by a series of baffles 19 in the presence of countercurrent air which is discharged at air injectors 17 at a rate insufficient to create an air lift in the inner cylinder.

Baffles 19 constitute one form of an inert packing material. Other forms of structured or unstructured packing may be used as is conventional in scrubbers as used in pollution abatement in power plants and chemical manufacturing. Structured packaging includes honeycombs and meshes. Unstructured packings are metal or ceramic articles of various shapes such as rings and saddles which provide a high surface area for contact between liquid and gas.

Figure 2:
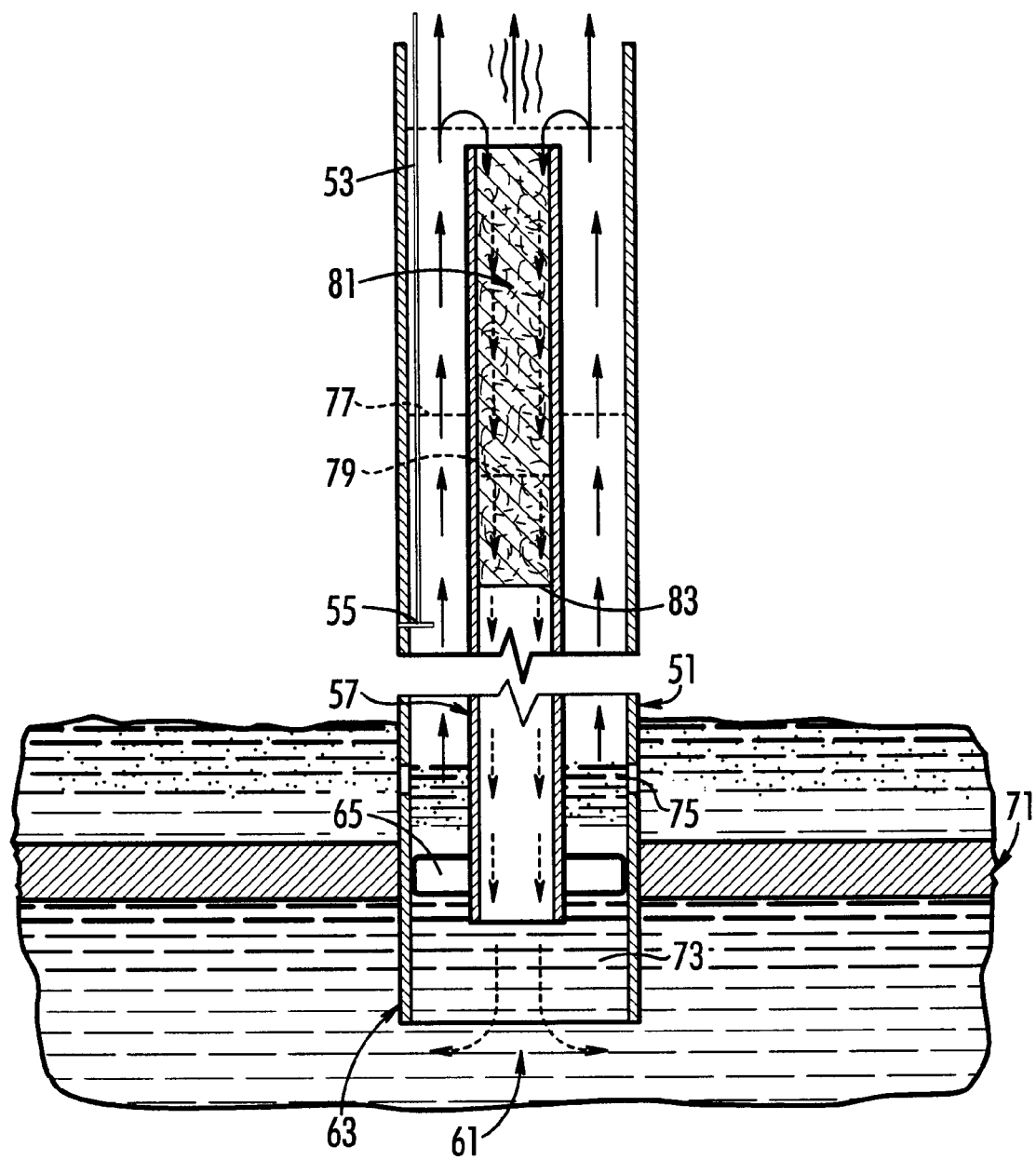
FIG. 2 shows a second embodiment which combines vapor stripping with permeable flow treatment.

FIG. 2 illustrates a second embodiment of the invention. In this embodiment, elements 51 through 65 correspond to elements 1–15 of the first embodiment. Their functions are substantially the same. Within the inner cylinder, low flow air injector 17 and baffles 19 are deleted. In its place is a packing material which interacts chemically with the contaminants in the water (as opposed to physical interaction in the first embodiment). Element 83 is a packing support in the form of a perforated disc or similar device which is functionally equivalent for the purpose of supporting a packing 81 while allowing sufficient throughput to prevent the inner cylinder from filling with returned water.

Depending upon the packing material chosen, a fibrous mat or other bedding material may be used in conjunction with the packing support. Several packing supports and attendant beddings may be required at levels above the position illustrated for element 83 in FIG. 2 dependent upon the permeability and or weight of the packing material.

Packing material 81 is preferably granular or fibrous and is limited primarily by the necessity for sufficient and consistent flow through the packing material. The material may or may not be covered with a porous mat, sand, pea-gravel, or other material as needed to prevent flotation of the packing material or to smooth the flow into the packing material.

The packing material is selected based upon an analysis of the contaminated aquifer, the specific components to be removed and operable treatment parameters.

The treatment modality is selected to provide a secondary treatment in the concentric discharge cylinder. Said secondary treatment can be performed using several treatment modalities, including: sorption, ion exchange, chemical destruction or stabilization, biological destruction or stabilization, energy based destruction or stabilization, phase transfer, and other modalities, including combinations of those listed. Specific examples of each of the listed classes of secondary treatment modalities include:

Sorption: activated carbon, natural or synthetic zeolite, diatomaceous substrate, peat and fibrous hydrophobic oil sorbent (e.g., polypropylene pads).

Ion exchange: commercial ion exchange resins, treated and untreated peat/algae, zeolites, ion specific exchange materials.

Chemical destruction or stabilization: zero valence metal (e.g., granulated cast iron, iron foam, or multiple metal combinations), sulfur or catalyst modified zero valence metal, chemical free radical processes (e.g., Fenton's reagent and ozone), and chemical free radical processes (e.g., Fenton's reagent and ozone), and chemical reduction processes (e.g., fly ash, stannous ion, or dithionate), precipitation reactions (e.g., phosphate rock or iron pyrite), and modification of pH or activity coefficient (limestone, dolomite, salts).

Biological destruction or stabilization: Supported bioreactor for oxidative destruction of contaminants that are primary substrates (oils, alcohols, etc.), oxidative cometabolic destruction of contaminants that are not primary substances (e.g., chlorinated solvents), anaerobic destruction, or stabilization of metals (e.g., chlorinated solvents), anaerobic destruction, or stabilization of metals (e.g., precipitation by biologically generated phosphate).

Energy based processes: contaminant destruction using light or radioactive decay energy, thermally enhanced destruction or removal, and electricity enhanced destruction, migration or collection.

Phase transfer: three phase countercurrent gas stripping using saddles, rings particles, fibers or other physical substrate, two phase gas sparging, and two phase continuous liquid extraction (e.g., water sinking through light organic fluid).

Specialized reactions such as amalgamation (mercury with copper or gold), and combinations of the various modalities.

The treatment modality employed can be chosen to augment the treatment performed during airlift pumping or can be modified to treat additional contaminants in the groundwater.

The arrangement of the components possible within the apparatus admits of multiple treatments within the inner cylinder. To this end, packing materials may be mixed or different treatment modalities may be applied at different levels as the returned water passes through the inner cylinder. For example, it may be desirable to adjust the pH of the water to be treated prior to bringing it into contact with a species-specific packing material.

Dependent upon the volume of contaminated water to be treated, the expected time period over which treatment is to be provided (frequently many years) and the capacities of the packing materials, it is desirable to provide a method for recharging the packing material. The packing material may be contained in a sleeve or cartridge insertable into inner cylinder 57 to allow removal of spent packing. Preferably, the replacement would be done when the air to the annular space had been turned off and flow through the packing had ceased. Removal and replacement may be performed using cables, rods or other devices and the method used is not a limitation. Suitable means such as gaskets will be used to avoid side-streaming of the water being treated.

The efficiency of the treatment method and the degree of exhaustion of packing material may be monitored by conventional methods such as pH meters, ion-specific electrodes, or capacitance, and these measurements may or may not be used to adjust other operating parameters such as air flow rates.

A source of air is required to pressurize injection lines 3 or 53. The source of the air is not critical so long as adequate flow and pressure are available to operate the apparatus as will be described later. The apparatus is capped and includes a vent which may be directed to the atmosphere or to a device for the treatment of VOC's as required. Such devices are ancillary to the invention disclosed.

The invention will now be described in terms of the first embodiment. Air is introduced through injection line 3 and distributed into the annular region at outlet point 5. Outlet point 5 is preferably a ring having a multiplicity of outlets. The exact structure of the outlet locations is not critical provided that it is capable of delivering large volumes of air into the annular space between the well-bore and the inner cylinder. The air bubbles preferably mix vigorously with the contaminated water in the annular region, reducing the specific gravity of the water superior to the outlet point. The flow of the air, combined with the lower specific gravity, produces air lift and raises the level of the water in the annular area from its static level 27 to a height 9, which is sufficient to spill over into the top of the inner cylinder 7.

At the spillover point a separation takes place between the air bubbles and the liquid water. The air flows out of the top of the apparatus through the aforementioned cap and venting system. The water cascades into the inner cylinder. Further outgassing occurs within the inner cylinder.

When the air admitted to the annular space contacts the contaminated water contained therein, multiple interfaces between liquid and gas are generated. Volatile components, typically VOC's, are partitioned between the gas and the liquid according to Henry's Law. The partitioned VOC's are then vented to the atmosphere as necessary.

When volatiles are the only component of concern in the contaminated aquifer, the apparatus of the first embodiment may be used to provide additional time and contact surface to polish the water on its descent through the cylinder to the level 29 of the static water from the lower aquifer. Air introduced at injection points 17 may be separately sourced or tapped from the injection line 3. The amount of air introduced is controlled to prevent airlift occurring within the inner cylinder and to maintain flow by keeping the density of the water substantially unchanged.

The second embodiment of this invention is directed to treatment of a contaminated aquifer wherein the contaminants are not sufficiently removed by sparging. In this embodiment, a packing material is used which is specific for or amenable to the treatment of the contaminant. As noted previously, a single packing may be used, a mixed packing or staged packings. The only limitations are that excessive heat generation be avoided, that channelization does not take place and that the rate of passage of the liquid through the packing material does not raise the effective operating water level in the inner cylinder to block entry of the aerated water from the annular area.

The invention has been described in terms of a system in which a static water level of an upper aquifer is higher than the static water level in the lower aquifer. The invention utilizes such a natural hydraulic gradient to enable the induction of flow while sparging at the same time. Utilization of these gradients allows the apparatus to operate efficiently with a comparative low energy demand. This is an important consideration when it is contemplated that the period of treatment may last many years.

Figure 3:
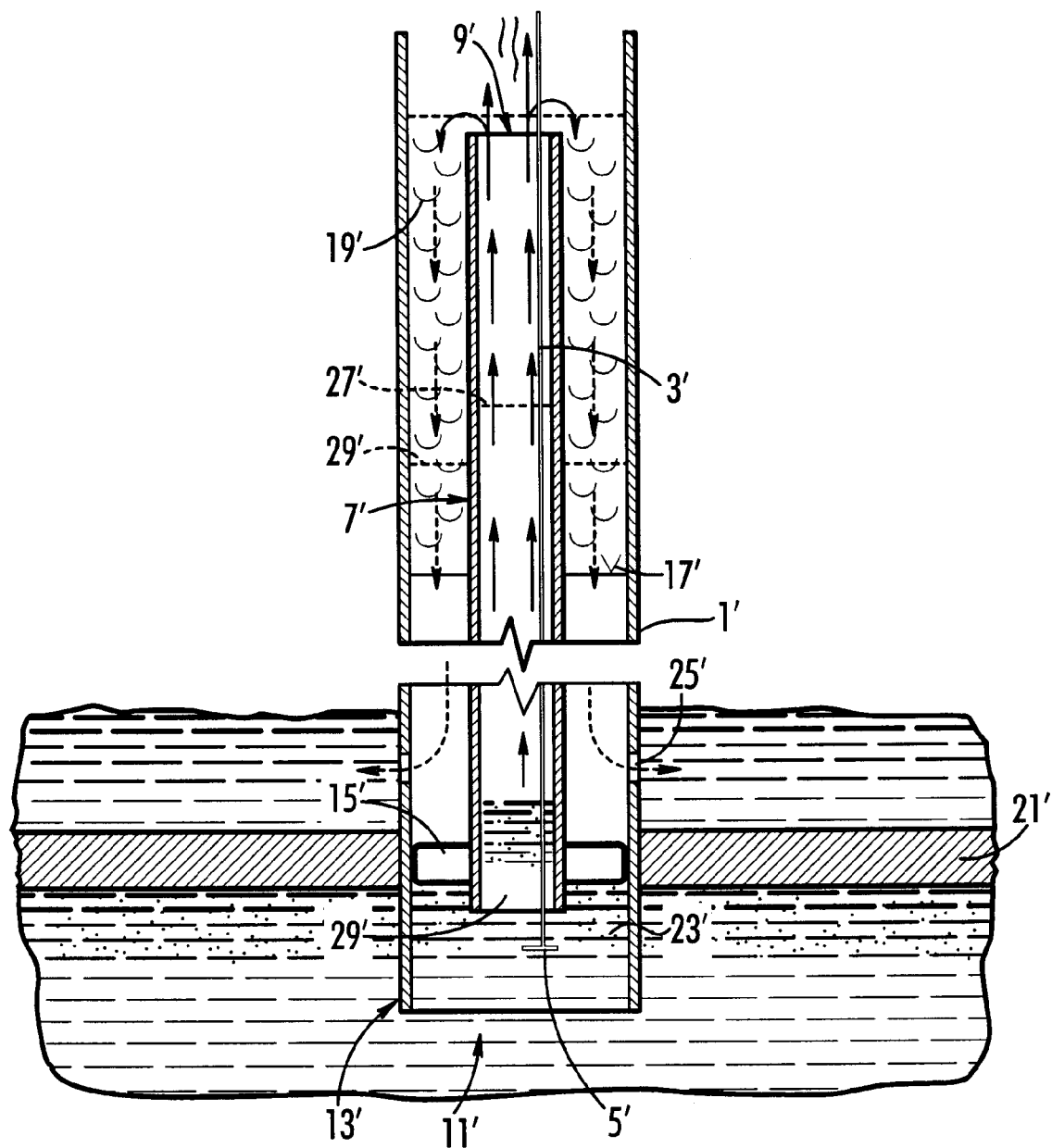
FIG. 3 illustrates a third embodiment wherein the water to be treated is in a lower aquifer and is air-lifted to an outer treatment zone.

Under different geological circumstances, it may be found that the hydraulic potentials between upper and lower aquifers are reversed from that illustrated in the drawings. In such circumstances, relocation of high airflow injection, together with the preferred secondary treatment process would achieve the same result. FIG. 3 illustrates this embodiment, the numbers corresponding to those in FIG. 1.

The invention is adapted to the relative hydraulic potentials of the aquifers. For example, the relative diameters of the well bore and the inner cylinder are adjusted as a function of the relative potentials and operating water levels. Likewise, a larger diameter treatment area is used for unstructured packing or baffles than that used for a solid packing such as an ion exchanger resin.

Because the apparatus is entirely below grade except for air supply and vents, it is not necessary to provide tanks above ground or to heat them.

Instead, the invention takes advantage of the heights of the vadose zone and aquifer thickness to provide a treatment space. Both the inside and outside of the inner cylinder are used so that the treatment zone effectively becomes twice the distance from the upper aquifer to the ground surface.

Because the system is entirely contained within the bore hole, it is not necessary to drill a second well to return the treated liquid to a clean aquifer. A large drain field is not required and sinkholes are avoided. In arid regions, the apparatus allows purification without depleting the limited supply of well water, essentially reclaiming all of the treatment water.

The described apparatus serves to meet the objective of treating and stabilizing an aquifer which is contaminated. The apparatus meets the objective of allowing multiple methods for treatments within a unitary device. The apparatus requires little above ground service support and is readily closed when no longer required. While the apparatus has been described in terms of the treatment of a contaminated aquifer in the presence of a clean(er) aquifer, the concept is applicable to the treatment of a single aquifer. For example, the reclaimed water could be injected below the contaminated aquifer or discharged above the contaminated aquifer but below the vadose zone. For some deep aquifers contaminated with lighter-than-water chemicals such as gasoline, it is envisioned that the inventive concept could be used to withdraw contaminated water from the upper reaches of the aquifer and return the treated water to the bottom of the aquifer.

These and other objectives can be achieved by the apparatus and method described above. Modifications such as are, or may be, obvious to one skilled in this art are included in the scope of the inventors' disclosure.

We claim:

1. An apparatus for the treatment and remediation of a contaminated aquifer in the presence of an uncontaminated aquifer comprising:

a wellbore inserted through a first, upper aquifer, and into a second, lower aquifer having well screens communicating with each aquifer;

an inner cylinder axially disposed within said wellbore, said cylinder having an open upper end and an open lower end, said upper end being positioned above the static water level of the upper aquifer and the operating water level of the lower aquifer and said lower end being positioned into said lower aquifer;

means for introducing and dispensing air under pressure into said contaminated aquifer below the static water level of that aquifer at a rate sufficient to lift said contaminated water above said open upper end of said inner cylinder;

a sealing device between said wellbore and said inner cylinder at a level between said upper and lower aquifers; and means for venting said wellbore, wherein the wellbore and the inner cylinder are concentric pipes.

2. An apparatus for the treatment and remediation of a contaminated aquifer in the presence of an uncontaminated aquifer according to claim 1, wherein said upper aquifer is the contaminated aquifer and air is dispensed under pressure into an annular region between said wellbore and said inner cylinder at a level below the static water level of said upper aquifer.

3. An apparatus according to claim 2 further comprising a plurality of low volume air injectors within said inner cylinder and means to supply same with air.

4. An apparatus according to claim 3 further comprising a plurality of baffles disposed within said inner cylinder and above said low volume air injectors.

5. An apparatus according to claim 1, wherein said sealing device is an inflatable or mechanical packer seal.

6. An apparatus according to claim 1 further comprising means for treating the air discharged above the water level at the top of said inner cylinder.

7. An apparatus according to claim 2 further comprising a packing material support within said inner cylinder and a packing disposed thereupon.

8. An apparatus according to claim 7 wherein said packing material is reactive with at least one contaminant component of said contaminated aquifer.

9. An apparatus according to claim 8, wherein the packing material is reactive with at least one contaminated component in a modality selected from the group comprising:

a) sorption;
b) ion exchange;
c) chemical conversion;
d) biological conversion;
e) energy conversion, and
f) phase transfer.

10. An apparatus according to claim 9 wherein said packing material to effect sorption is selected from the group comprising activated carbon, natural or synthetic zeolites, diatomaceous substances, peat and hydrophobic oil sorbents.

11. An apparatus according to claim 9 wherein said packing to effect ion exchange is selected from the group consisting of anion exchange synthetic beads, cation exchange synthetic heads, ion specific synthetic compositions, treated and untreated peat and algae and natural and synthetic zeolites.

12. A apparatus according to claim 9 wherein said packing material to effect chemical conversion is selected from the group comprising zero valence metals, sulfur or catalyst-modified zero valence metal, free radical process initiators, reducing agents, precipitants and pH and ionic strength modifiers.

13. An apparatus according to claim 9 wherein said packing material to effect a biological conversion is selected from the group comprising bound or suspended algae, molds, activated sludge, and enzymes.

14. An apparatus for the treatment and remediation of a contaminated aquifer in the presence of an uncontaminated aquifer according to claim 1, wherein said lower aquifer is the contaminated aquifer and air is dispensed under pressure into the inner cylinder at a level below the static water level of the lower aquifer.

15. An apparatus according to claim 14 further comprising a plurality of low volume air injectors in the annular region between said well bore and said inner cylinder and means to supply same with air.

16. An apparatus according to claim 15 further comprising a plurality of baffles disposed within the annular region between said well bore and said inner cylinder and above said low volume air injectors.

17. An apparatus according to claim 14 further comprising a packing support within the annular region between said well bore and said inner cylinder and a packing disposed thereupon.

18. An apparatus according to claim 17, wherein the packing material is reactive with at least one contaminated component in a modality selected from the group comprising:
 a) sorption;
 b) ion exchange;
 c) chemical conversion;
 d) biological conversion;
 e) energy conversion, and
 f) phase transfer.

19. An apparatus according to claim 18 wherein said packing material to effect sorption is selected from the group comprising activated carbon, natural or synthetic zeolites, diatomaceous substances, peat and hydrophobic oil sorbents.

20. An apparatus according to claim 18 wherein said packing material to effect ion exchange is selected from the group comprising anion exchange synthetic beads, cation exchange synthetic heads, ion specific synthetic compositions, treated and untreated peat and algae and natural and synthetic zeolites.

21. A apparatus according to claim 18 wherein said packing material to effect chemical conversion is selected from the group comprising zero valence metals, sulfur or catalyst-modified zero valence metal, free radical process initiators, reducing agents, precipitants and pH and ionic strength modifiers.

22. An apparatus according to claim 18 wherein said packing material to effect a biological conversion is selected from the group comprising bound or suspended algae, molds, activated sludge, and enzymes.

23. A method for the treatment and remediation of a contaminated aquifer in the presence of an uncontaminated aquifer comprising:
 inserting a cylindrical well pipe having well screens through an upper aquifer and into a lower aquifer;
 inserting an inner cylindrical pipe into said well pipe a distance sufficient to place its bottom end below the water level of the lower aquifer and its top end above the static water level of the upper aquifer, wherein the cylindrical well pipe and the inner cylindrical pipe are concentric;
 sealing the annular space between the inner cylinder and the well pipe so as to separate said upper and lower aquifers;
 introducing a stream of air beneath the static water level of the contaminated aquifer sufficient to lift the water and cause a flow over the top of said inner cylinder; and
 venting the vapor from a headspace above said inner cylinder.

24. A method according to claim 23 further comprising aerating the water which has flowed over the top of said inner cylinder during its decent to the uncontaminated aquifer.

25. The method of claim 23 further comprising contracting the water discharges over the top of said inner cylinder with a packing material in said inner cylinder.

26. The method of claim 25 wherein the packing material is an adsorbent for at least one contaminant component in said contaminated aquifer.

27. The method of claim 25 wherein the packing material reacts chemically with at least one contaminant component in said contaminated aquifer.

28. The method of claim 23 wherein the discharged vapor is treated before release into the atmosphere.

29. A method according to claim 23 wherein the contaminated aquifer is the lower aquifer.

30. A method according to claim 23 wherein the contaminated aquifer is the upper aquifer.

31. A method for treating and reclaiming water in a contaminated aquifer comprising:
 inserting a cylindrical well pipe having upper and lower well screens into an aquifer;
 inserting an inner cylindrical pipe into said well pipe a distance sufficient to place the bottom end at or about the level of the lower well screen and the top above the static water level of the aquifer, wherein the cylindrical well pipe and the inner cylindrical pipe are concentric;
 sealing an annular space between the wellbore and the inner cylinder at a height between the two well screens;
 introducing a stream of pressurized air into one of said the annular spaces above the seal and the lower portion of said inner cylinder at rate so as to lift the water and cause it to flow over the top of said inner cylinder; and
 venting the headspace above the inner cylinder.

32. A method according to claim 31 wherein the air is introduced into the lower portion of said inner cylinder.

33. A method according to claim 31 wherein the water which has flowed over the top of said inner cylinder is further aerated or its descent to the static water level.

34. The method of claim 31 further comprising contracting the water discharges over the top of said inner cylinder with a packing material in said inner cylinder.

35. The method of claim 31 wherein the packing material is an adsorbent for at least one contaminant component in said contaminated aquifer.

36. The method of claim 31 wherein the packing material reacts chemically with at least one contaminant component in said contaminated aquifer.

37. The method of claim 31 wherein the discharged vapor is treated before release into the atmosphere.

38. A method according to claim 36 wherein said material which reads chemically with at least one contaminate component is selected from the group consisting of zero valence metals, sulfur or catalyst modified zero valence metals, free radical initiators, reducing agents, precipitates and pH adjusting compounds.

39. A method according to claim 34 wherein said packing material is a biologically active material selected from the group comprising an apparatus according to claim 9 wherein said packing to effect a biological conversion is selected from the group consisting of bound or suspended algae, molds, activated sludge, and enzymes.

* * * * *